UNITED STATES PATENT OFFICE.

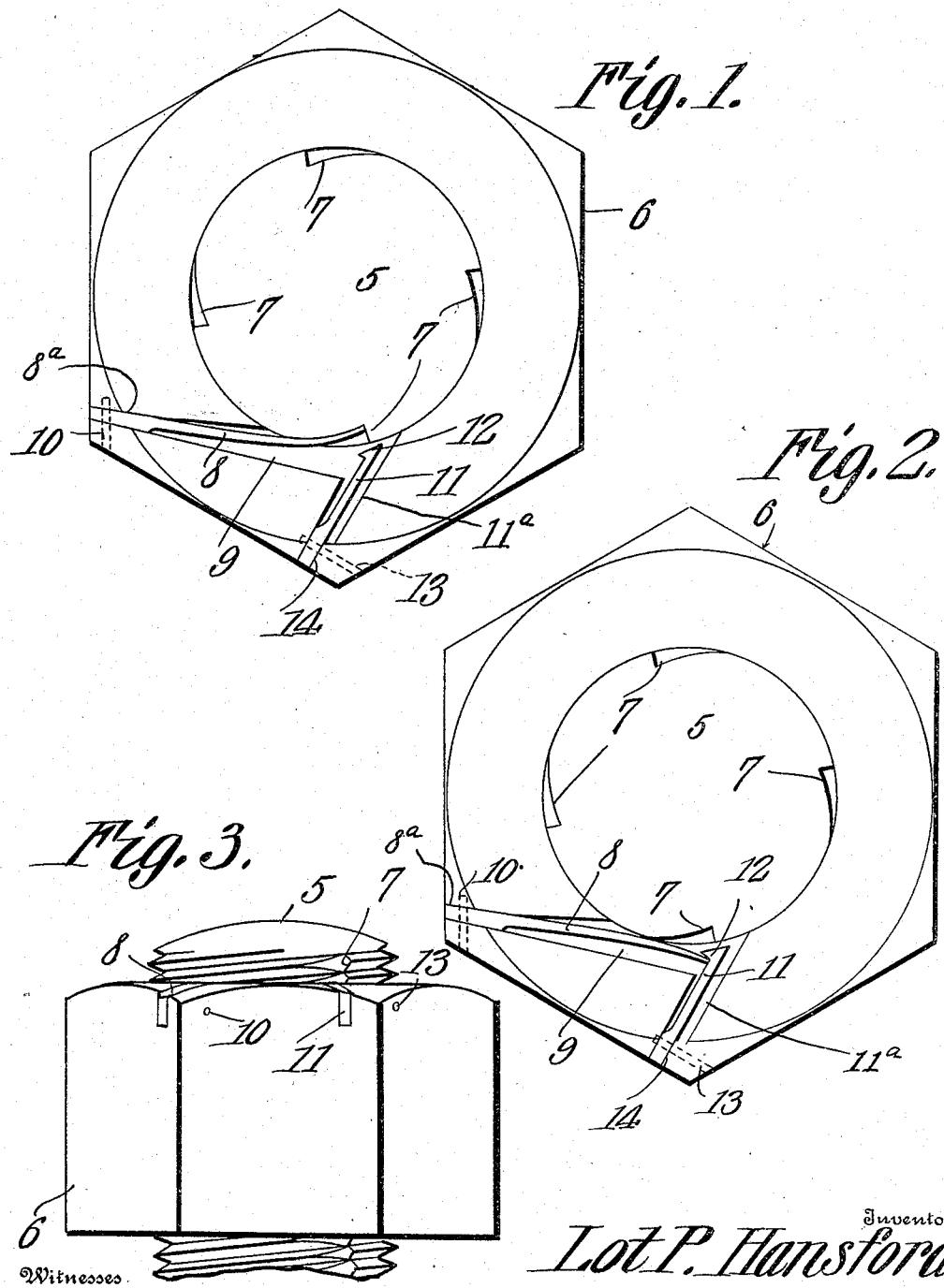

LOT P. HANSFORD, OF SALEM, WEST VIRGINIA.

NUT AND BOLT LOCK.

937,149.  Specification of Letters Patent.  Patented Oct. 19, 1909.

Application filed December 18, 1908. Serial No. 468,187.

*To all whom it may concern:*

Be it known that I, LOT P. HANSFORD, a citizen of the United States, residing at Salem, in the county of Harrison and State of West Virginia, have invented a new and useful Nut and Bolt Lock, of which the following is a specification.

This invention relates to that type of nut and bolt locks in which the nut is locked to the bolt by means of a pawl-and-ratchet mechanism, the pawl being carried by the nut, and the bolt having notches which are engageable by the pawl.

The object of the present invention is to provide a nut lock of this kind which is simple in structure, and efficient in operation, and also to provide means for holding the pawl in inoperative position in order that the nut may be readily turned off the bolt if desired.

With the foregoing objects in view, the invention consists in the novel construction and arrangement of parts to be hereinafter described and claimed, reference being had to the drawings hereto annexed, in which—

Figure 1 is an end view of a bolt and nut, showing the application of the invention, the latter being shown locked. Fig. 2 is a similar view showing the pawl held in inoperative position. Fig. 3 is a side elevation of the nut and a portion of the bolt.

In the drawings, 5 denotes the bolt, and 6 is the nut screwed thereon, that portion of the bolt which receives the nut being formed with longitudinally extending notches 7 which are engageable by a pawl carried by the nut.

The pawl herein referred to is indicated by the reference numeral 8, it being mounted in a recess 9 in the outer face of the nut. Said recess communicates with the bolt hole of the nut and the pawl extends therethrough into position to engage the notches 7. The pawl is a thin strip of spring metal and is secured to the nut by placing its shank in a slot 8ª extending across the outer face of the nut from one side thereof to the recess 9, a pin 10 passing through the body of the nut and shank within the slot. The normal tendency of the pawl is to move in the direction of the bolt, by reason of which it will spring into one of the notches when the nut is turned into position to bring said notch adjacent to the free end of the pawl. The notches are so shaped that the pawl slips over the same without catching when the nut is being screwed on the bolt.

For holding the pawl off the bolt, in order that the nut may be turned off, I provide a catch 11 which is a spring strip having at its free end a hook 12. The catch is mounted in a slot 11ª extending across the face of the nut from one side thereof and communicating with the recess 9. Said slot and the slot 8ª extend across the face of the nut from adjoining sides thereof. The catch extends transversely with respect to the pawl, and its hook 12 is in the path of the free end thereof, so that said end of the pawl may be snapped under the hook, thus holding the pawl away from the bolt, as shown in Fig. 2 of the drawings. When the pawl is thus held the nut can be turned off the bolt in the ordinary manner. The catch is secured by means of a transverse pin 13 extending through the body of the nut from one side thereof, and through the catch, the latter seating in a groove 14 extending from one side of the nut to the recess 9. Upon disengaging the catch from the pawl, the latter springs back into position to engage the notches 7 when any one of the same is brought adjacent to the free end of the pawl, whereby the nut is locked on the bolt, and securely held against rotating in a direction to come off.

It will be seen from the foregoing that I have provided a nut lock which is simple in construction, efficient in operation, and easily applied, and the invention therefore effectually serves the purpose for which it is designed.

What is claimed is:

The combination with a notched bolt, of a nut thereon having a recess in its outer face, and slots extending across said face from adjacent sides of the nut and communicating with the recess, a pawl secured in one of the slots, and having its free end projecting into the recess and engageable with the notches of the bolt, and a catch secured in the other slot, and having its free end hook-shaped and projecting into the recess, said end extending into the path of the free end of the pawl, and adapted to engage the same to hold the pawl in inoperative position.

In testimony that I claim the foregoing as my own, I have hereto affixed my signature in the presence of two witnesses.

LOT P. HANSFORD.

Witnesses:
E. H. CAVAN,
N. S. LONGABAUGH.